(12) United States Patent
Kelly et al.

(10) Patent No.: US 9,228,602 B2
(45) Date of Patent: Jan. 5, 2016

(54) CONNECTOR ASSEMBLY

(71) Applicant: Fastmount Limited, Auckland (NZ)

(72) Inventors: Gregory John Kelly, Auckland (NZ); Ronald Hanley, Waimauku (NZ)

(73) Assignee: FASTMOUNT LIMITED, Auckland (NZ)

( * ) Notice: Subject to any disclaimer, the term of this patent is extended or adjusted under 35 U.S.C. 154(b) by 0 days.

(21) Appl. No.: 14/257,363

(22) Filed: Apr. 21, 2014

(65) Prior Publication Data

US 2014/0314517 A1    Oct. 23, 2014

(30) Foreign Application Priority Data

Apr. 23, 2013 (NZ) .......................................... 609740

(51) Int. Cl.
*F16B 21/18* (2006.01)
*F16B 21/07* (2006.01)

(52) U.S. Cl.
CPC ............. *F16B 21/073* (2013.01); *F16B 21/186* (2013.01)

(58) Field of Classification Search
CPC ........ F16B 5/0246; F16B 5/0258; F16B 5/06; F16B 5/0607; F16B 21/16; F16B 21/18; F16B 21/20; F16B 41/00; F16B 41/002; F16B 43/00; F16B 21/073; F16B 21/186; F16L 5/10
USPC ............. 411/352, 353, 383, 517, 546; 16/2.1, 16/2.2, 2.4
See application file for complete search history.

(56) References Cited

U.S. PATENT DOCUMENTS

| 1,548,586 | A |   | 8/1925 | Edkins |
|---|---|---|---|---|
| 2,907,418 | A | * | 10/1959 | Hudson et al. ................. 403/21 |
| 3,137,336 | A | * | 6/1964 | Wing ............................. 411/135 |
| 3,362,276 | A | * | 1/1968 | Gould ........................... 411/512 |
| 3,909,920 | A | * | 10/1975 | Cornish et al. ............... 29/522.1 |
| 4,957,403 | A | * | 9/1990 | Corain et al. ................. 411/368 |
| 5,533,237 | A |   | 7/1996 | Higgins |
| 5,876,024 | A | * | 3/1999 | Hain ........................... 267/141.4 |
| 6,227,784 | B1 | * | 5/2001 | Antoine et al. ............... 411/369 |
| 8,066,461 | B2 | * | 11/2011 | Travers ......................... 411/352 |
| 2009/0271970 | A1 | * | 11/2009 | Hanley et al. ............. 29/525.02 |

FOREIGN PATENT DOCUMENTS

| BE | 485620 | 1/1949 |
|---|---|---|
| CH | 608060 | 12/1978 |
| DE | 3916542 | 11/1990 |

* cited by examiner

*Primary Examiner* — Roberta Delisle
(74) *Attorney, Agent, or Firm* — Young & Thompson

(57) ABSTRACT

Disclosed is a connector assembly, which includes a metal base which defines a housing cavity arranged to receive the end of a male connector, a resilient interface element inside the housing cavity, and a metal clip inside the housing cavity by the resilient interface element. The metal clip engages removably with the end of the male connector inserted into the housing cavity to connect the metal base to the male connector. Also disclosed is a resilient interface element providing an interface between a male connector and a metal base defining a housing cavity to receive the end of a male connector, as well as a kit of parts. Such kit contains a metal base defining a housing cavity receiving the end of a male connector, a metal clip arranged to be capable of engaging removably with the end of the end of the male connector, and a resilient interface element.

20 Claims, 8 Drawing Sheets

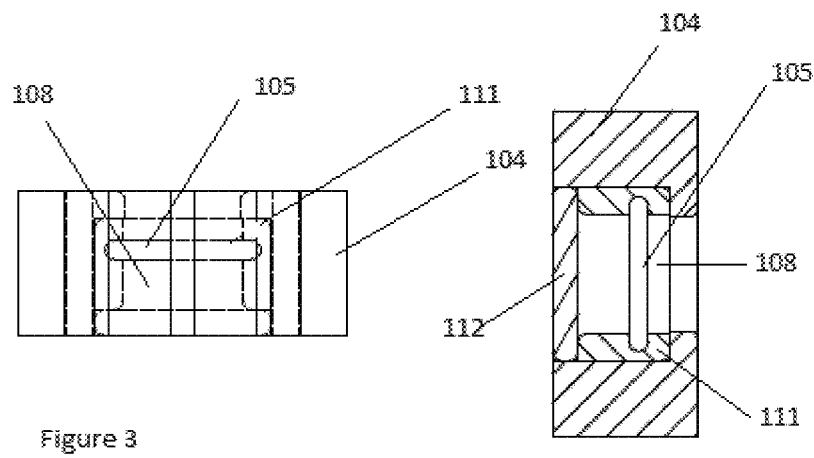
Figure 3
Figure 4
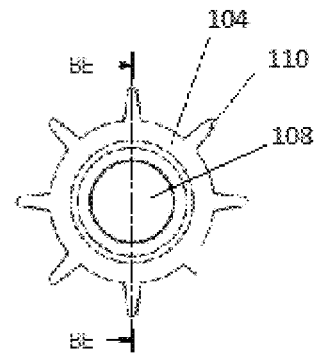
Figure 5
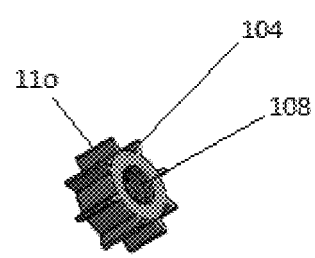
Figure 6

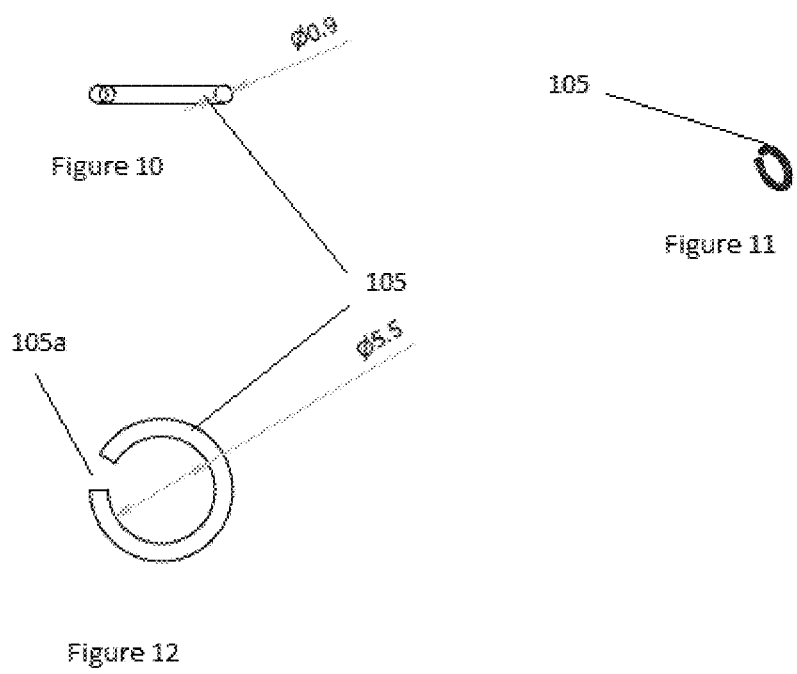

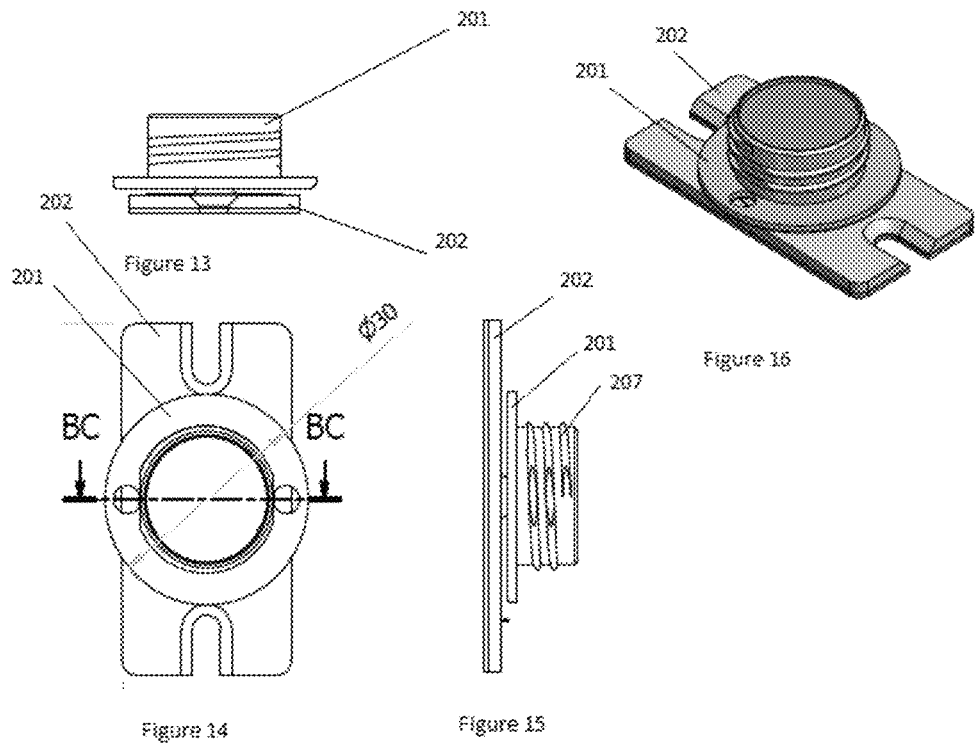
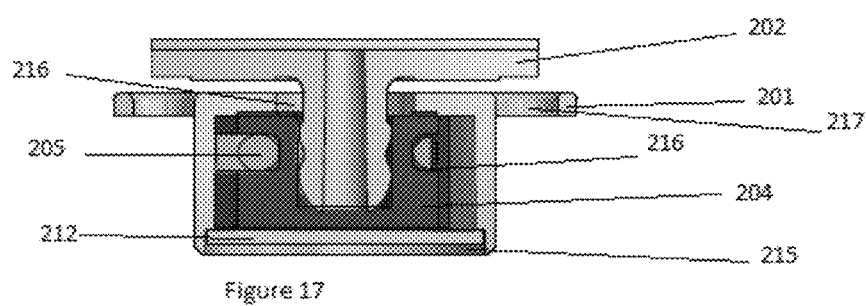

CONNECTOR ASSEMBLY

TECHNICAL FIELD

This invention relates to an improved connector. In preferred embodiments the invention may be used to provide a push through connection system formed from or including metal components.

BACKGROUND ART

A wide variety of systems have been developed to engage two or more components together. Push through or snap lock connectors in particular allow a user to simply push one component onto another. Connected components can also be separated with the application of a large enough force to pull these components apart.

These types of push through snap lock connection systems have been used to good effect to mount panels to substrate structures like walls, floors and ceilings. A representative example of this type of push through panel connection system is disclosed in US patent publication number US2009/0271970. This type of push through connection system allows heavy panels to be securely attached to a substrate, and also easily and quickly removed if required.

The connectors used in these types of systems are generally formed from plastic materials. Although plastics are an inexpensive material they are not necessarily suited for all applications. Metal connectors can provide advantages in terms of the overall strength and durability of the connector formed, and when properly seated on a substrate or panel metal connectors can support relatively heavy loads.

Plastic clip systems are also not appropriate when a surface used to mount panels is formed from a fire rated wall or similar. In these applications plastic clips could fail in the event of a fire, and potentially could degrade the thermal isolation provided by a firewall.

However metal connectors are by their very nature rigid and have limited tolerances for inaccuracies or misalignment in the placement of components. Variations in ambient temperature can result in the expansion and contraction of the materials of both a panel and a mounting substrate. Thermal expansion and contraction effects can in turn result in misalignment of the various push together components of the connector system—potentially resulting in panels rattling or producing other unwanted noise effects.

It would therefore be of advantage to have an improved connector which addressed any or all of the above issues or at the least provide the public with an alternative choice. In particular it would be of advantage to have an improved connector assembly which could be formed from metal or any other suitable fire resistant strong and durable material, and which allowed for greater tolerance in the positioning of connector components.

DISCLOSURE OF INVENTION

According to one aspect of the present invention there is provided a connector assembly which includes
a metal base which defines a housing cavity arranged to receive the end of a male connector,
a resilient interface element located inside the housing cavity,
a metal clip located inside the housing cavity by the resilient interface element,
the metal clip being arranged to engage removably with the end of the male projection inserted into the housing cavity to connect the metal base to the male connector.

Preferably the male connector is formed from metal.

The present invention provides a connector assembly. This connector assembly includes a metal base which forms a housing cavity. In some embodiments the connector assembly provided by the invention may also include a male connector.

The housing cavity defined by the metal base is arranged to receive one end of a male connector. The male connector and the metal base are configured to be engaged removably together to support a panel mounted to a substrate surface. Preferably the connection assembly provided by the invention allows a metal base to be attached securely to a surface of a panel, or a mounting substrate, where the corresponding male projection is attached to the remaining substrate surface or panel.

In a preferred embodiment the male connector is formed from a metal material. This arrangement of the invention provides the majority of the components of a connector assembly from metal materials, providing the invention a fire resistant character.

The invention includes a resilient interface element which is located or received inside the housing cavity of the metal base. This resilient interface element is formed from a resilient and/or flexible and/or deformable material. The resilient interface element also defines an aperture arranged to allow entry of the end of the male connector into the housing cavity. The aperture is preferable located centrally in the resilient interface element.

In a preferred embodiment the resilient interface element may be formed from rubber or an equivalent material having a Shore hardness of between 100 and 200. In a further preferred embodiment of the material used to form the resilient interface element exhibits a Shore hardness of approximately 120.

In a preferred embodiment the resilient interface element defines a main body forming a central aperture which allows the passage of the end of male connector, in addition to a plurality of leg extensions projecting from this main body. In this configuration the resilient interface's legs can extend into contact with interior side walls of the metal base. Leg projections may be distributed at regular intervals on the perimeter of the main body to provide the interface element with multiple points of contact with the metal base. The leg projections may be arranged to provide a selected compressibility or flexing for a given material, allowing the manufacturer to provide given resilience using materials of differing Shore Hardness. In an alternative embodiment the interface element may have apertures within the periphery of the element to achieve a similar effect as increasing flexibility to the leg extensions, as will be understood by the reader. In a further embodiment the interface element may have a cross-section which varies along the central axis to provide the interface with flexibility.

Those skilled in the art will appreciate that the above arrangement of a resilient interface element can allow for minor changes in the position of a panel relative to its mounting substrate.

Furthermore, the resilient material used to form an interface element may also perform as an insulator against vibrations and sound transmission.

The intervention of the interface element has the potential to damp down noise effects generated by a mounted panel—particularly when these panels are used inside moving environments such as building lift interiors or vehicle interiors.

The present invention also provides a metal clip. A metal clip provided by the invention forms a device that grips and holds the end of the male connector when inserted into the housing cavity and through the central aperture of the resilient interface. The metal clip engages removably with the end of a male connector to hold it and the metal base together. The resilient interface locates the metal clip in a desired position within the housing cavity to ensure that the metal clip can engage with the end of a male connector.

The use of a metal clip by the invention may also provide a fire safety advantage as a heat affected clip will still hold on to the end of a male connector irrespective of whether the interface element has burnt away or not. The effect of damage or entire destruction of the interface element by heat will still leave projecting elements of the remaining metal base to catch and lock onto the clip as the interface fails and the panel slumps against the mounting substrate. This behaviour provides a significant advantage in terms of where panels may be installed—particular with prior art panel connector systems which could result in a connector failing and panels falling from a ceiling or high wall. When heat affected panels are mounted to a side wall, the action of gravity on the panel will cause it to slump downwards, but not to lose connection with the wall substrate. This may be contrasted with the prior art, where heat induced failure of connector systems could result in a cascade of panels falling randomly from a room's walls and ceiling.

In a preferred embodiment a metal clip used by the invention may be formed by a spring clip. A spring clip can be formed by a resilient "C" profile metal element with the internal sides and ends of the element being used to grip on opposite sides of the end of a male projection. Spring clips can be formed from metal materials and will also release the end of the male projection when a force above a certain threshold is applied to pull the male projection out of the metal base.

Those skilled in the art will however appreciate that other forms of resilient clips may be used in various embodiments of the invention and references to the "C" profile clip discussed above should in no way be seen as limiting.

In a preferred embodiment the resilient interface element may also define at least one channel and/or one or more complementary surfaces for a metal clip. In various embodiments these forms of structures are employed to engage the clip with the resilient interface and allow the resilient interface to position the clip.

In a preferred embodiment the connection assembly provided by the invention allows a metal base and preferably a metal male connector to be connected by an intervening resilient interface element. In such embodiments the resilient interface element prevents any contact between the male connector and the metal base. This characteristic of the invention accommodates minor adjustments in the relative positions of either a panel or a mounting substrate through compression and deformation of the resilient interface element. Furthermore the resilient interface element may perform a shock absorbing role, reducing noise effects produced by motion induced vibration in the panel or mounting substrate.

In a preferred embodiment the male connector may have an aperture which is capable of allowing the metal male connector to enter the metal base but has dimensions which do not allow withdrawal of the metal male connector with the clip engaged. In the event of fire or other conditions which cause the interface element to fail, the metal base will retain the metal mail element in the cavity by nature of the aperture, male connector and clip dimensions. Any panel attached by the connector may be retained in place even under conditions which cause the interface to melt, burn or otherwise fail.

The invention also may provide particular advantages in terms of fire safety applications. Aside from the resilient interface element, all other remaining components employed in the connector assembly can be formed from metal.

Forming the majority of the components of the connector assembly from metal also provides for added strength and durability in the components provided. A panel connector assembly provided by the invention can be used in applications where there is a need to be able to perform multiple engagements of the clip. In such applications a panel may need be installed and then removed and re-attached many times, with the metal components provided by the invention standing up to long term wear and tear effects.

In another embodiment the connector assembly may comprise a sleeve or bush capable of receiving the male connector and being located by the resilient interface element. The sleeve or bush may be formed of metal. The sleeve may provide better wear resistance that provided by direct contact between the male element and the resilient interface element. The clip may be received by the sleeve. The connector assembly may include a cap to retain the clip within the sleeve.

In another embodiment the invention may provide resilient interface element operable to provide an interface between a male connector and a metal base which defines a housing cavity to receive the end of a male connector, the resilient interface element arranged to be located in the housing cavity and define an interface aperture for the male connector to locate the male connector within the housing cavity, the interface element further arranged to locate a metal clip with respect to the interface cavity so as to engage the male connector when received in the interface aperture.

This may allow the metal clip to removably engage with the end of the male projection inserted into the housing cavity to connect the metal base to the male connector.

The resilience of the interface element may locate the male element relative to the metal base but allow a degree of movement between the metal base element, which defines the housing cavity, and the male connector. Depending on the materials from which the resilient element is formed, the resilient element may also provide mechanical, vibration, electrical and/or thermal isolation of the metal base and the metal connector.

The resilient element may be arranged to receive a sleeve or bush within the interface aperture and the male connector may be received by the sleeve.

In another embodiment the invention provides a kit of parts for a connector assembly which includes:
a metal base which defines a housing cavity arranged to receive the end of a male connector,
a metal clip arranged to be capable of engaging removably with the end of the end of the male connector;
a resilient interface element arranged to be capable of being located inside the housing cavity and capable of locating a the metal clip inside the housing so as to engaging removably with the end of the male projection when inserted into the housing cavity to connect the metal base to the male connector.

In further embodiments metal parts may be substituted with similar parts of other materials that are suitably hardwearing, rigid and/or resistant to fire or heat. The materials might include ceramics.

It will be apparent to the reader that the resilient interface element may also be referred to as a flexible interface element as the reader will understand that projections on the interface may flex to provide resilience for the interface between the metal base and the male connector and also because a variety of suitable materials are both resilient and flexible.

BRIEF DESCRIPTION OF THE DRAWINGS

An example embodiment of the invention is now discussed with reference to the drawings in which:

FIG. 3 shows a side view of components of the metal base, resilient interface element and clip of a connection assembly according to an alternative embodiment of the present invention;

FIG. 4 shows a cut-away view of the metal base, resilient interface element and clip of a connector assembly according to the embodiment of the invention illustrated with respect to FIG. 3;

FIG. 5 shows a plan view of a resilient interface element according to the embodiment of the present invention illustrated with respect to FIG. 3 and FIG. 4;

FIG. 6 shows a perspective view of the interface element illustrated with reference to FIG. 5;

FIG. 10 shows a side view of a spring clip according to the embodiment of the invention illustrated with respect to FIGS. 4 to 9;

FIG. 11 shows a perspective view of the spring clip according to the embodiment of the invention illustrated with respect to FIGS. 4 to 10;

FIG. 12 shows a plan view of the spring clip according to the embodiment of the invention illustrated with respect to FIGS. 4 to 11;

FIG. 13 shows a side view of a connector assembly according to a further alternative embodiment of the invention;

FIG. 14 shows plan view of a connector assembly according to the embodiment of the invention illustrated with respect to FIG. 13;

FIG. 15 shows a side view of a connector assembly according to the embodiment of the invention illustrated with respect to FIG. 13 and FIG. 14;

FIG. 16 shows a perspective view of a connector assembly according to the embodiment of the invention illustrated with respect to FIGS. 13 to 15;

FIG. 17 shows a cutaway side view of a connector assembly according to the embodiment of the invention illustrated with respect to FIGS. 13 to 16;

BEST MODES FOR CARRYING OUT THE INVENTION

Figure 1:
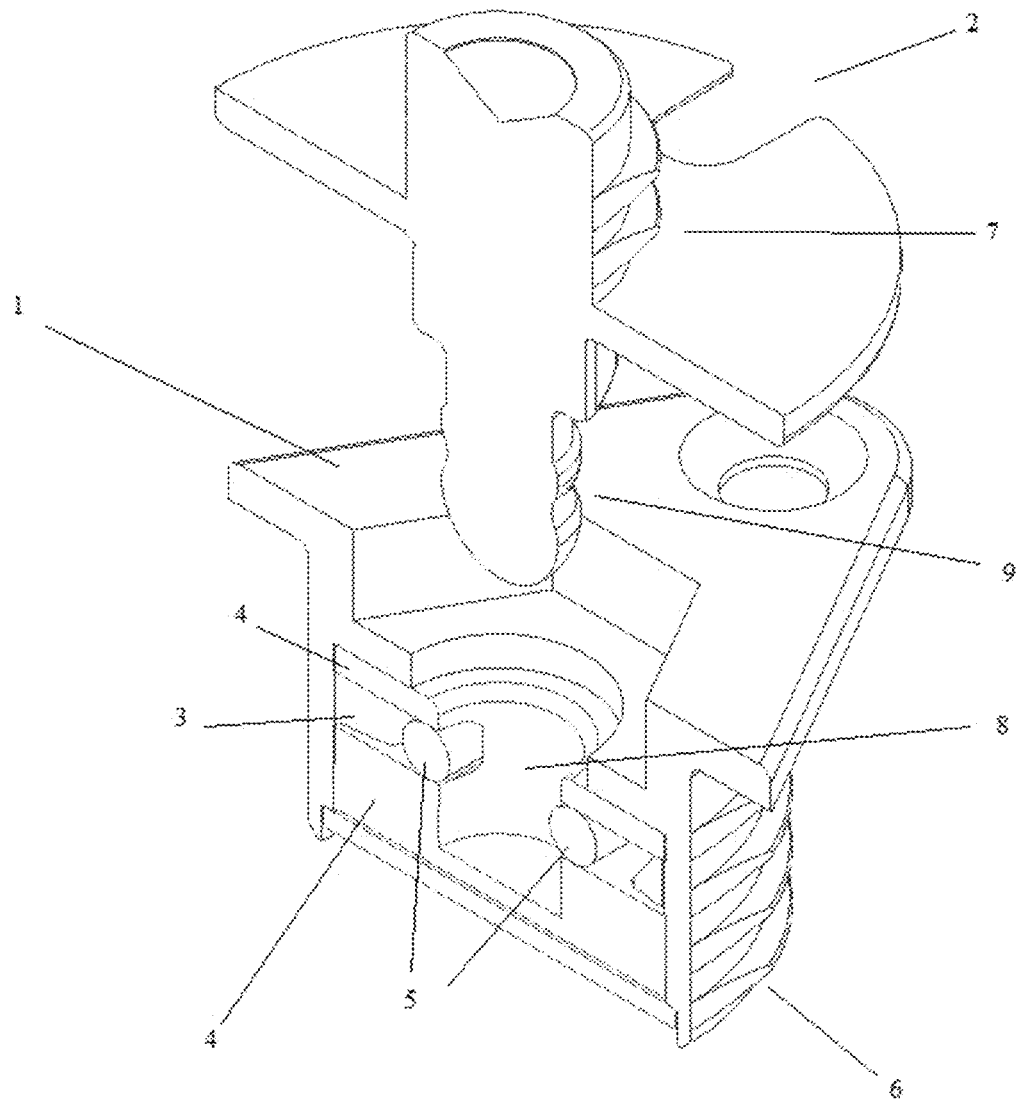
FIG. 1 shows a perspective cross-section view of components of a connection assembly provided in accordance with a preferred embodiment.

FIG. 1 shows a perspective cross-section view of the components of a connection assembly provided in a preferred embodiment. The connection assembly includes a metal base 1. This metal base is arranged to engage with a male connector 2.

The metal base defines a housing cavity 3 which is arranged to receive and locate a resilient interface element 4. This interface 4 is formed from a resilient deformable material.

A channel formed in the sidewalls of the interface 4 locates a metal spring clip 5. The spring clip 5 is used by the connection assembly to grasp the end of the male connector 9 when inserted into the housing cavity of the metal base 1 and central aperture 8 of the interface 4. The application of a sufficient force on the male connector will result in the spring clip releasing it and allowing the male connector 2 to be removed from the metal base 1.

Figure 2:
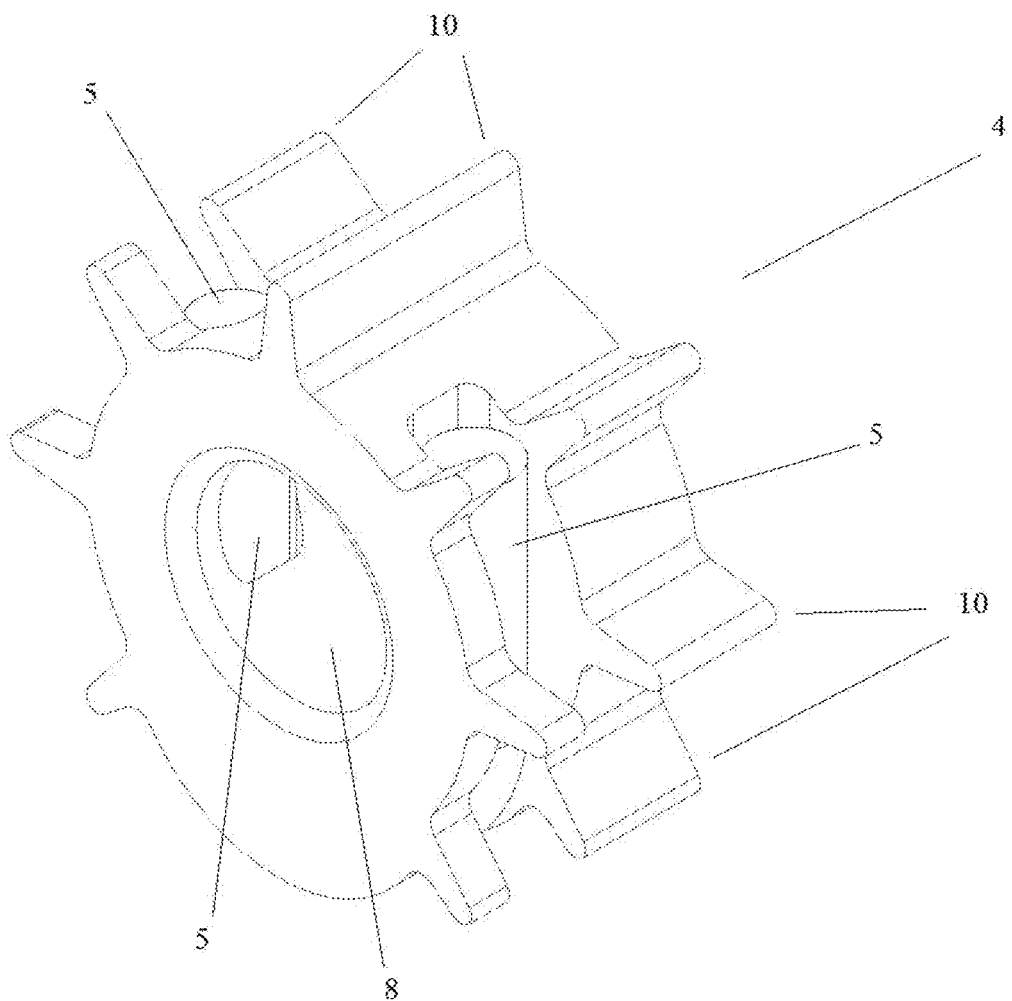
FIG. 2 shows further details of the resilient interface element 4 illustrated with respect to FIG. 1.

FIG. 2 shows further details of the resilient interface element 4 illustrated with respect to FIG. 1.

The Interface 4 is defined primarily by a large body which forms a central aperture 8.

Projecting from the interface body are a number of legs 10.

The interface 4 also defines a channel in which it receives and locates the spring clip 5. In this way the interface 4 locates the clip 5 inside the metal base. Each of the legs 10 can act as a vibration shock absorber, providing a cushion or buffer between a male connector and metal base. The legs 10 also allow flexibility in the location of the metal base 1 and the male connector 2.

An alternative embodiment will now be illustrated with reference to FIGS. 3 to 12.

FIGS. 3 to 6 show a resilient interface element 104 which defines an aperture 108 in which receives and locates the end of the male connector 109 (not shown). A clip 105 is located approximately around the circumference of the aperture 108 to engage with the male connector 109 (not shown) when in the aperture 108. This embodiment has a sleeve or bush 111 located in the aperture 108 of the resilient interface element 104. The bush 111 or this embodiment is terminated by a cap 112.

Projections 110 are shown formed in the resilient interface 104. In this embodiment the projections are flexible to allow movement of the aperture 108 while biasing the aperture 108 towards the center of the interface element 104.

Figure 7:
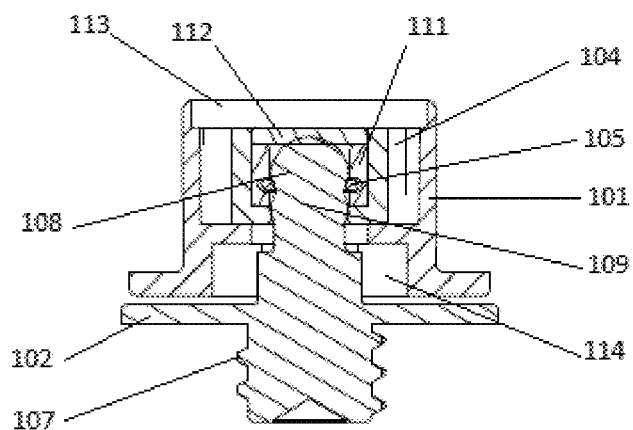
FIG. 7 shows a cut-away view of a connector assembly according to the embodiment of the present invention illustrated with respect to FIGS. 3 to 6.
Figure 8:
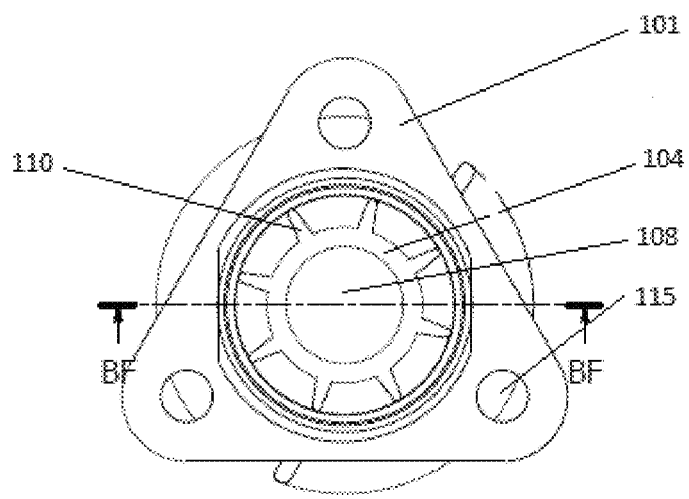
FIG. 8 shows a plan view of a connector assembly according to the embodiment of the present invention illustrated with respect to FIGS. 3 to 6.

A complete connector assembly according to the same embodiment as illustrated with reference to FIGS. 3 to 6 is shown in FIGS. 7 and 8. FIG. 7 shows a second cap 113 which terminates the housing cavity of the metal base 101. FIG. 7 shows a second cavity 114 formed in the metal base 101.

As shown in FIG. 7 the male connector 109 is received in the sleeve 111 and engaged removably by the clip 105. The sleeve 111 and male connector 109 are located within the housing cavity of the metal base 101 by the aperture 108 of the interface element 104. The projections 110 of the interface element 104 abut the walls of the metal base 101 and the flexible nature of the projections 110 bias the aperture and male connector 109 towards the centre of the housing cavity of the metal base 101 but allow tolerance for fitting of panels. The male connector 101 is located longitudinally in the housing cavity of the metal base 101 by the clip 105 engaging the profile of the male connector 109 and, to a lesser extent in this embodiment, by a flange on the metal base 101 abutting a flange on the connector 102. The profile has a section of reduced cross-section to facilitate engagement by the clip 105.

Figure 9:
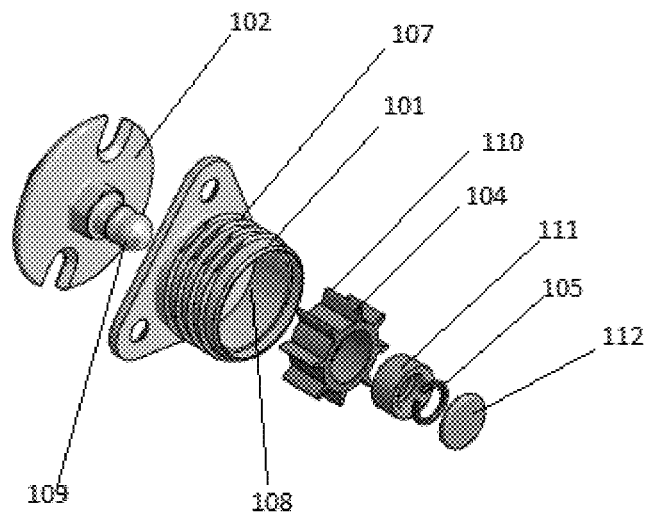
FIG. 9 shows an exploded perspective view of a connector assembly according to the embodiment illustrated with respect to FIGS. 4 to 8.
Figure 18:
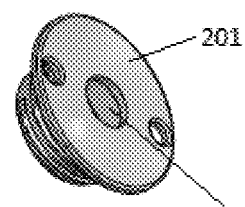
FIGS. 18 and 19 shows perspective views of a base according to the embodiment of the invention illustrated with respect to FIGS. 13 to 17.
Figure 19:
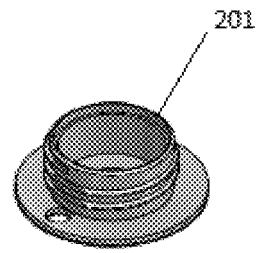
Figure 20:
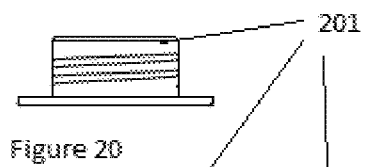
FIGS. 20, 21 and 22 show a side view, plan view and another side view respectively of a base according to the embodiment illustrated with respect to FIGS. 13 to 19.
Figure 21:
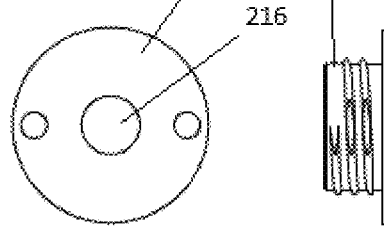
Figure 22:
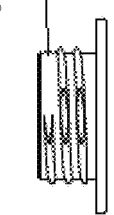

FIG. 9 shows an exploded view of the connector assembly of the embodiment illustrated with respect to FIGS. 3 to 8.

FIGS. 10 to 12 show a clip 105 according to the embodiment illustrated with respect to FIGS. 3 to 9. The clip of this embodiment is formed from a resilient metal and defines a gap 105a to allow expansion to receive the leading end of the male connector 109 and then contract around a reduced profile section (not shown) of the connector 109 to engage it.

A connector assembly according to a further alternative embodiment is shown in FIGS. 13 to 22. This embodiment is suited to aviation applications and may be formed from lightweight materials known to the reader.

The base 201 connects to a connector 202. A thread 207 is formed on the base 201.

Compared to the embodiments described previously, this connector has a lower depth. Also the connector 202 has an elongate flange.

As shown in FIG. 17 the male connector 209 is received in a cavity 208 and is engaged by the clip 205. The clip is received in a channel 216 formed in the interface element 204. The male connector has a recess 218 formed in its profile to facilitate the clip engaging the end of the connector 209. The end of the connector 209 extends into the cavity of the base 201 through a base aperture 216. In this embodiment the base aperture has a diameter which is smaller than the clip 205 when engaging the male connector 209. A cap 212 received in an end aperture 215 holds the interface element 204 in the base 201.

In use the end of the male connector 209 is inserted through the base aperture 216, is located centrally by the interface aperture 208. The clip 205 engages the end of the connector 209 to locate it longitudinally within the housing cavity of the base 201. Resilience of the interface 204 and flexibility of projections (not shown) formed in the interface element to abut the walls of the housing cavity of the base 201 bias the connector 209 towards an engaged position while allowing movement.

In the event of a fire or other event which causes failure of the interface element 204, the clip 205 will remain engaged with the connector 209. As the clip so engaged is wider that the base aperture 216 and will prevent the connector 202 from entirely disengaging the base 201. Any panel secured to any substrate by the connector assembly with remain substantially secured even in the event of melting, burning or failure otherwise of the interface element 104.

In alternative embodiments the interface element may be solid, relying on resilience or compressibility of the material used to form the element in place of relying on flexibility or resilience of the legs. Other embodiments may have apertures in the interface element to provide increased or selected youngs modulus resilience or damping properties compared to a solid element. In further embodiments the interface element may have a cross-section which varies along the central axis to provide the interface with flexibility.

Further embodiments may have alternate clip arrangements, such as will be known to the reader.

Further embodiments have combinations of the features illustrated above.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention.

The invention claimed is:

1. A connector assembly which includes:
   a metal base which defines a housing cavity arranged to receive the end of a male connector;
   a resilient interface element located inside the housing cavity; and
   a metal clip located inside the housing cavity by the resilient interface element, the metal clip being arranged to engage removably with the end of the male connector inserted into the housing cavity to connect the metal base to the male connector,
   wherein the resilient interface element comprises leg projections which extend into contact with interior side walls of the metal base, and
   wherein the leg projections are distributed at regular intervals on the perimeter of the resilient interface element to provide the resilient interface element with multiple points of contact with the metal base.

2. The connector assembly of claim 1 wherein the male connector is formed from metal.

3. The connector assembly of claim 1 including the male connector.

4. The connector assembly of claim 3 wherein the male connector and the metal base are configured to be engaged removably together.

5. The connector assembly of claim 3 wherein the metal base is arranged for attachment to one of a panel and a mounting substrate, and wherein the male connector is attached to another of the panel and the mounting substrate, whereby the connector assembly connects the panel to the mounting substrate.

6. The connector assembly of claim 1 wherein the resilient interface element is formed from a resilient and deformable material.

7. The connector assembly of claim 1 wherein the resilient interface element defines an aperture arranged to allow entry of the end of the male connector into the housing cavity.

8. The connector assembly of claim 1 wherein the resilient interface element exhibits a Shore hardness of between 100 and 200.

9. The connector assembly of claim 1 wherein the resilient interface element exhibits a Shore hardness of approximately 120.

10. The connector assembly of claim 1 wherein the leg projections are arranged to provide a selected compressibility for a material for of a given shore hardness.

11. The connector assembly of claim 1 wherein the resilient interface element is formed from a material suitable to isolate against vibrations and sound transmission.

12. The connector assembly of claim 1 wherein the metal base defines an aperture and wherein the aperture has dimensions that do not allow removal of the male connector with the metal clip attached.

13. The connector assembly of claim 1 wherein the metal clip is formed by a spring clip.

14. The connector assembly of claim 13 wherein the resilient interface element also defines at least one of a channel and a complementary surface for the metal clip.

15. The connector assembly of claim 1 including a sleeve capable of receiving the male connector.

16. The connector assembly of claim 15 wherein the sleeve is located in the resilient interface element.

17. The connector assembly of claim 16 including a cap to retain the metal clip in the sleeve.

18. A resilient interface element operable to provide an interface between a male connector and a metal base which defines a housing cavity to receive the end of a male connector, the resilient interface element arranged to be located in the housing cavity and define an interface aperture for the male connector to locate the male connector within the housing cavity, the resilient interface element further arranged to locate a metal clip with respect to the interface aperture so as to engage the male connector when received in the interface aperture, wherein the resilient interface element comprises leg projections which extend into contact with interior side walls of the housing cavity, and wherein the leg projections are distributed at regular intervals on the perimeter of the resilient interface element to provide the resilient interface element with multiple points of contact with the housing cavity.

19. The resilient interface element of claim 18 including projections arranged to connect with a wall of the housing cavity to locate the resilient interface element and the interface aperture within the housing cavity.

20. A kit of parts for a connector assembly which includes:

a metal base which defines a housing cavity arranged to receive the end of a male connector, a metal clip arranged to be capable of engaging removably with the end of the male connector;

a resilient interface element arranged to be capable of being located inside the housing cavity and being capable of locating the metal clip inside the housing cavity so as to engage removably with the end of the male connector when inserted into the housing cavity to connect the metal base to the male connector, wherein the resilient interface element comprises leg projections which extend into contact with interior side walls of the housing cavity, and wherein the leg projections are distributed at regular intervals on the perimeter of the resilient interface element to provide the resilient interface element with multiple points of contact with the housing cavity.

* * * * *